July 29, 1958 A. B. KARN 2,845,041
ADHESIVE APPLICATOR DEVICE
Filed Feb. 16, 1955 2 Sheets-Sheet 1
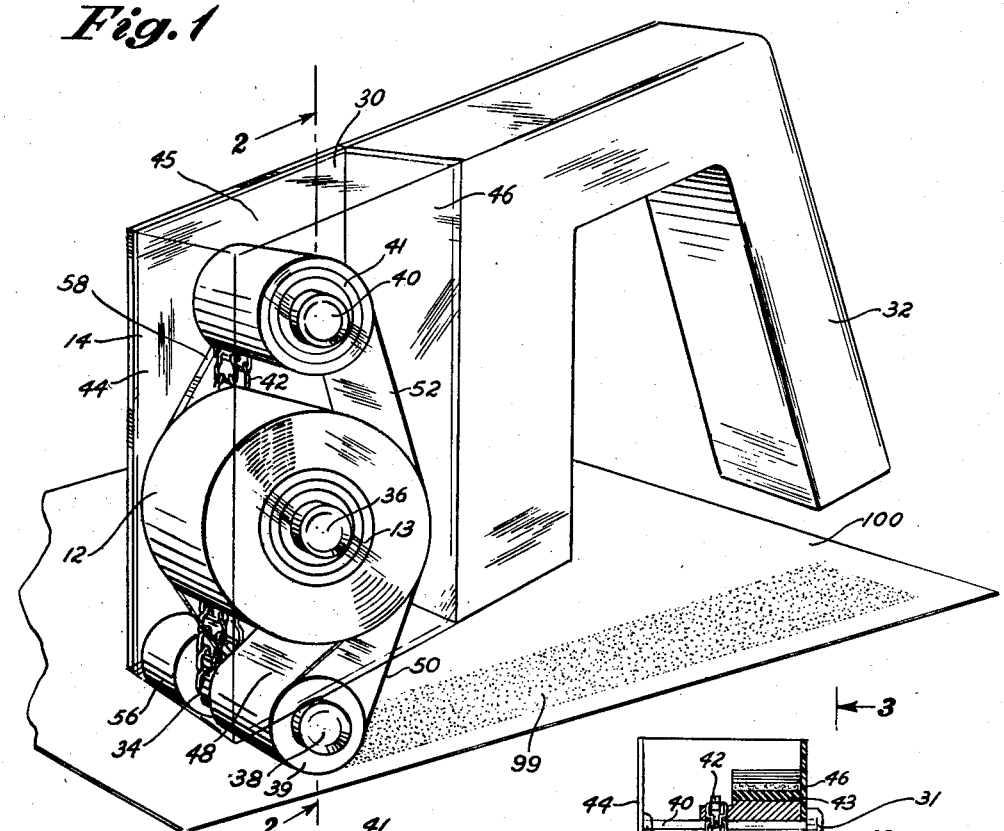
Fig. 1
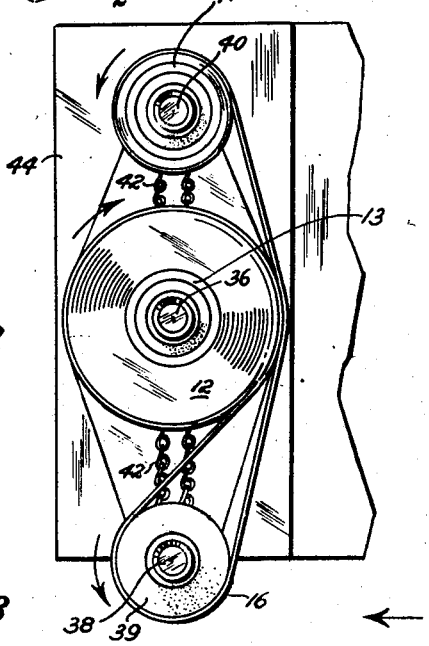
Fig. 4
Fig. 3
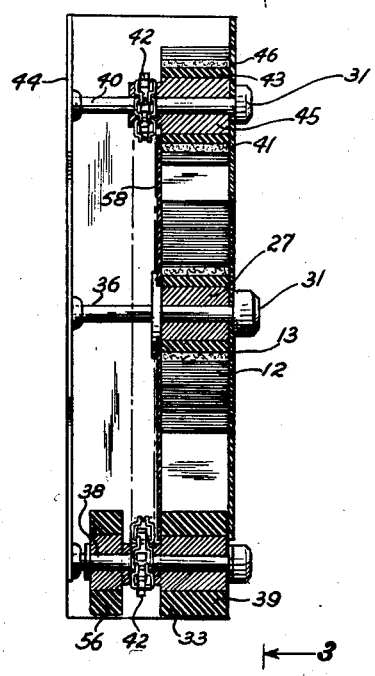
Fig. 2

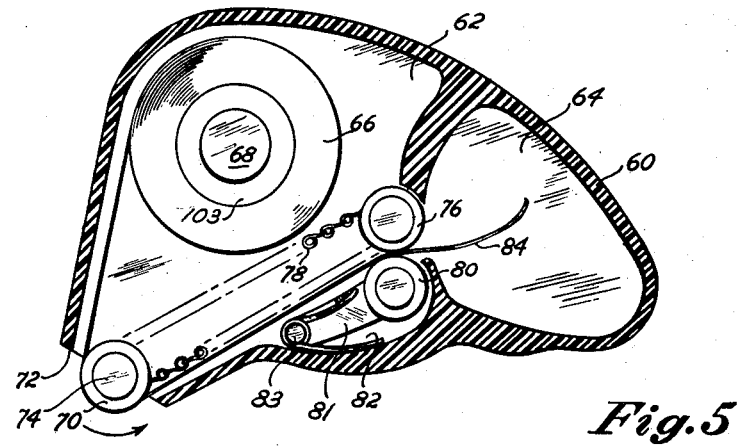
Fig. 5
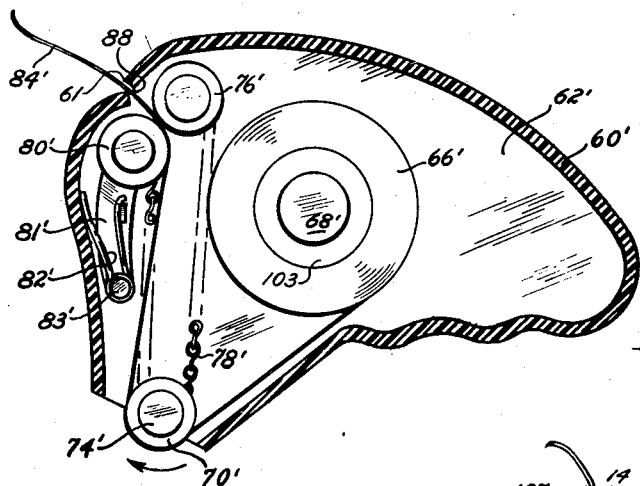
Fig. 6
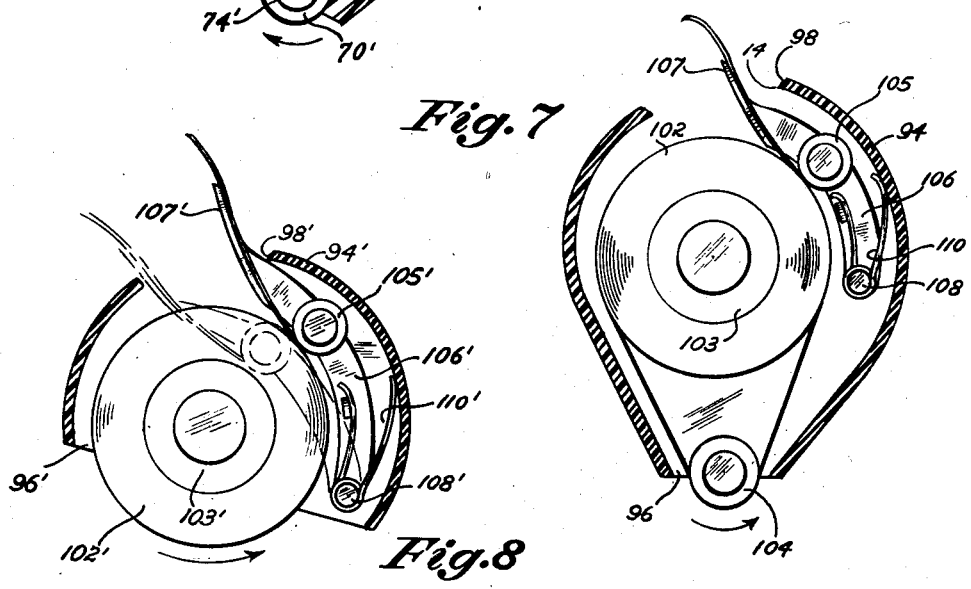
Fig. 7
Fig. 8

United States Patent Office 2,845,041
Patented July 29, 1958

2,845,041

ADHESIVE APPLICATOR DEVICE

Andrew B. Karn, New York, N. Y.

Application February 16, 1955, Serial No. 488,620

2 Claims. (Cl. 118—257)

This invention relates generally to pressure-sensitive adhesives, and more particularly, to transferring pressure sensitive tapes and to methods of using these tapes to apply a layer of normally ever-tacky gum to a desired surface. The invention further relates to suitable dispensers for using such tapes, and, also, to an improved transferring pressure sensitive tape which is particularly suitable for use in these dispensers.

Adhesive transferring type tapes already known in the art are designed to be used in strips, the tape being laid manually or by mechanical means against the surface of an article such as an advertising print, sign or poster which is to be mounted upon a surface such as a wall or a window by means of the ever-tacky gum layers which shall have become transferred to the article from the tape body, or an article which is an industrial goods, such as a piece of furniture to which a veneered surface is to be fastened by means of the transferred ever-tacky gummed layers.

In using these tapes several operations are presently required. The tape is unrolled from the tape roll and laid on the desired surface; following which the tape end is cut off from the roll of tape; then, usually, pressure must be applied to the tape strip in order to expedite the transferring action; after which the strip of tape body must be removed just prior to final use of the article in order to expose the transferred ever-tacky gum layer. Finally the strip of waste tape body must be disposed of. The use of both hands is required in order to properly apply and cut the tape which may result in difficulty and awkwardness in securely holding in the desired position the article which is being processed.

Because the above operations are time consuming and generally impractical at the point of final use, articles such as advertising prints, signs and displays are generally processed in bulk by the application of the strips of transferring pressure sensitive type by means of mechanical equipment of a relatively high order of cost and complication, designed for the continuous processing of relatively large numbers of articles of similar shape and size, which articles are subsequently transported to the ultimate users, each of whom usually received a small number of such articles, who remove the affixed tape body strips at the time of use. The advantages of using pressure sensitive articles such as neat appearance, rapid mounting, cleanliness, removability, reuseability and general convenience are thus generally limited to the small proportion of articles which are processed mechanically in the above manner, since most concerns which provide advertising prints, signs, etc., are unwilling to undertake the expense and inconvenience of making these pressure sensitive, and the great proportion of these advertising prints, signs, etc. must therefore be mounted by means of glue or appended strips of conventional pressure sensitive tape, which are makeshift in appearance, or other methods which are less convenient and less attractive.

Likewise there are many applications which lend themselves ideally to pressure sensitive treatment, such as photograph mountings, advertising art work, soft goods banding, display mountings, various specialized industrial uses, etc., where glues, rubber cements, conventional pressure sensitive cellophane tape and other products are presently employed, where pressure sensitive coating would be more desirable for reasons of cleanliness, attractiveness, convenience, etc., if suitable means were provided for inexpensively and rapidly making articles pressure sensitive at the point of final use.

It is therefore among the principal objects of the present invention to provide hand dispensers which are capable of utilizing transferring type pressure sensitive tape for the purpose of instantly and conveniently applying layers of ever-tacky gum to a surface which it is desired to be coated, principally at the point of final use.

It is also among the principal objects of the present invention to provide hand dispensers capable of utilizing transferring type pressure sensitive tape for the purpose of instantly applying layers of ever-tacky gum to a surface which it is desired to be coated, in one continuous operation wherein the ever-tacky adhesive is continuously stripped from the backing tape and the stripped tape body, which functions as a type of conveyor belt for the ever-tacky adhesive, is simultaneously taken up, the dispensers including means for disposing of the stripped tape body.

Another object of the invention lies in the provision of hand dispensers capable of utilizing transferring type pressure sensitive tape for the purpose of instantly and conveniently applying layers of ever-tacky gum to a surface which it is desired to be coated, which may be operated with one hand only, leaving the other hand free for holding the article which is to be coated or for performing other functions.

Still another object of the invention lies in the provision of suitable hand dispensers for use in conjunction with the above-mentioned tape, in which the cost of fabrication may be of a reasonably low order, with consequent wide sale, distribution and use throughout the purchasing public.

A feature of the invention lies in the fact that the dispenser provides a means of supporting the tape roll, as well as a means of enclosing the tape roll, so that the tape is protected from damage and the hazards of excessive handling and from the accumulation of dust and dirt, and yet is always ready for immediate use, without the need for removing the tape roll from a protective package or wrapping.

An additional feature of the invention lies in the fact that suitable means are provided for continuously inducing considerable pressure along the length of the back of a transferring type pressure sensitive tape in order to induce a strong bond between the ever-tacky gummed layer and the surface of an article to which it is being applied.

An additional feature of the invention lies in the fact that by using tapes having heavier or lighter coatings of ever-tacky gums, or different degrees of tackiness, or different formulations, the characteristics of the adhesive layer which is deposited upon a desired surface, such as adhesive strength, tackiness, heat resistance, transparency, aging qualities, etc., may be varied to suit a given use.

Since present pressure sensitive transferring tapes are designed to be used in strips which are laid against the surface of an article and then subsequently peeled off by hand, they are designed with a relatively high degree of affinity between the tape and the adhesive, which affinity need be just less than the affinity of the adhesive to the surface against which it has been applied, at the time of removal of the tape strip body, since a considerable pulling force may be applied by the hand which grasps an end of the tape strip body in order to peel it away from the ever-tacky gummed layer, without excessive effort on the part of the user. This relatively high degree of affinity between the tape and the adhesive is normally desirable because it reduces the tendency of the adhesive to offset to the back of the underlying convolution of the tape when in roll form. Furthermore, since in their most general application, present transferring tapes are laid against the surface of an article such as an advertising print, sign, or poster, which article is generally subsequently handled, packaged, and transported to the ultimate user, a relatively high degree of affinity between the tape and the adhesive is desired, in order that the tape remain affixed to the ever-tacky gummed layer to protect the same from becoming dirty or soiled (which would impair its stickiness) or from being rubbed off the article through contact with other articles, or from sticking to the adjacent article. However, those present transferring pressure sensitive tapes which are designed primarily for use on articles such as advertising prints, signs and posters employ adhesives of light or moderate tackiness, for the reason that these articles are generally intended to be temporarily mounted and are furthermore of a relatively weak internal structure being made of such materials as paper or cardboard or thin plastic sheetings, so that an adhesive which would bind the article too strongly to the mounting surface such as a wall or a window might cause the article to be torn in the process of dismounting and such an adhesive might also continue to adhere to the mounting surface itself and would have to be removed with difficulty and inconvenience to the user. Thus, the fairly strong bond between the tape and the ever-tacky gummed layer tends to prevent instant transference to most surfaces, since the bond between the tape and the adhesive remains greater than the affinity which the adhesive is able to develop for a surface against which it is briefly pressed, so that when the tape is removed, the adhesive pulls away from the surface and remains affixed to the tape. This condition may be overcome by allowing an appreciable period of time to elapse during which the tape remains in contact with said surface, until the ever-tacky adhesive is able to develop a bond with that surface which exceeds its affinity for the tape; this may in some cases take many hours. This condition may also be overcome by the application of considerable pressure on the back of the tape in order to accelerate the bonding of the ever-tacky adhesive to said surface, but this entails considerable effort and inconvenience on the part of the user.

When the above type of transferring tape is used in a hand dispenser which is a provision of this invention, it is found that while transference of the ever-tacky gummed layer may be induced instantly, the degree of pressure which must be applied by the user of the dispenser is appreciably greater and thus the ease of the operation appreciably less than when an improved transferring tape is provided, which has a very weak bond between the tape and the ever-tacky gummed layer.

When the application is such that a type of present pressure sensitive transferring tape which has an adhesive of heavy tackiness may be used in said hand dispenser, which would not require that much pressure be employed in order to induce transference of the ever-tacky gummed layer to the surface of the article, there is the danger, where that surface is weak in structure or has low fibre strength, as in the case of newsprint or a painted surface which is not firmly bounded to the underlying area, that the surface will rupture and particles will adhere to the ever-tacky gummed layer and be carried away by it in the course of taking up the tape body, rather than that the ever-tacky gummed layer will become transferred from the tape body, because of the relatively high degree of affinity between the tape and the adhesive.

In addition, it is found that, regardless of the degree of tackiness of their adhesive, when present transferring type pressure sensitive tapes, which have a relatively high degree of affinity between the tape and the ever-tacky adhesive, are used in a hand dispenser, an appreciably higher degree of effort must be expended by the user in operating the dispenser, because of the amount of energy required to strip the tape body free of the transferred adhesive, and in breaking off the ever-tacky gummed layer after a strip of ever-tacky gum of the desired length has been applied to the surface of the article, than is the case when the improved transferring tape is used. An additional reason for this is that there is a tendency for the tape roll to become unwound due to tensions set up in the tape when the gummed layer is being broken off from the tape, and, since this condition is most simply overcome by increasing the braking force on the tape roll, the drag of this additional load is imposed on the system.

It is therefore also among the principal objects of the present invention to provide an improved pressure sensitive offsetting tape which may be used in my hand dispensers with a minimum of effort on the part of the user, in order to apply a layer of ever-tacky gum to the surface of an object, principally at the point of final use, by means of appropriate selection of the tape material and its proper subsequent treatment.

Another object of the invention lies in the provision of an improved transferring pressure sensitive tape capable of being used to instantly transfer a layer of ever-tacky gum to the surface of an object by means of the application of relatively light pressure on the back of the tape, even though the adhesive is of relatively light tackiness.

Another object of the invention lies in the provision of an improved transferring pressure sensitive tape, in which the tape body has been coated by a repellent to a point where it will barely resist any tendency of the ever-tacky gummed adhesive layer to become bodily transferred to the back of the tape at an adjacent convolution when the tape has been wound in roll form.

Another object of the invention lies in the provision of an improved pressure-sensitive transferring type tape, in which the back of the tape body is so treated as to have practically no affinity for the ever-tacky gummed layer disposed on the coated side.

These objects and features, as well as other incidental ends and advantages, will become more fully apparent during the course of the following disclosure, and be pointed out in the appended claims.

On the drawings, to which reference will be made in the specification, similar reference characters have been employed to designate corresponding parts throughout the several views.

Figure 1 is a fragmentary view in perspective showing a first embodiment of the invention.

Figure 2 is a vertical transverse sectional view of the embodiment, as seen from the plane 2—2 on Figure 1.

Figure 3 is a fragmentary elevational view as seen from the right-hand portion of Figure 2.

Figure 4 is a sectional view showing the application of the pressure sensitive tape comprising a part of the embodiment to a dry, relatively rigid surface.

Figure 5 is a sectional view showing a second embodiment of the invention.

Figure 6 is a sectional view showing a third embodiment of the invention.

Figure 7 is a sectional view showing a fourth embodiment of the invention.

Figure 8 is a sectional view showing a fifth embodiment of the invention.

In accordance with the invenion, the first embodiment thereof, as seen on Figures 1 to 3, inclusive, comprises broadly: a roll of pressure-sensitive transferring tape 12 and a dispenser means 14 for applying the same to a relatively rigid surface wherein the pressure-sensitive adhesive is transferred from the tape thereupon.

As indicated on Figure 4 of the drawing, the tape 12 includes a flexible tape body 16 having an outer surface 18 which is relatively free of the pressure-sensitive adhesive, as well as an inner surface 20 provided with a suitable clutch coating 22 which serves to make the same possess only a slight affinity for the ever-tacky gum 24 which is deposited thereupon prior to application. The tape body 16 may consist of any suitable material, as for example Holland cloth, glassine or similar materials, the same serving as a temporary support for the gum 24. While the inner surface 20 has only a highly limited adhesion with the adhesive layer, the outer surface 18 is suitably waxed or otherwise treated so as to process practically no affinity for the same.

The dispenser means 14 preferably includes an associated handgripping means 32 and an enclosed chamber 30, to which access may be gained by means of a removable cover 45, preferably made of transparent plastic. As shown in Figure 2, the cover is held in position by means of knurled nuts 31, which fit on to the threaded ends of spindles 36 and 40. The tape dispensing means 34 is almost entirely disposed within the chamber 30, and includes a tape roll supporting spindle 36 to which is fixed a mounting spool 27, on which the tape roll 12 revolves, a tape feed roller spindle 38 on which revolves a tape feed roller assembly 33 and a take-up spool spindle 40 on which revolves a take-up spool assembly 45. Drive means 42, preferably in the form of a sprocket and chain, interconnect the feed roller assembly 33 and take-up spool assembly 45 such that rotation imparted to the former will be transmitted to the latter. The spindles 36, 38 and 40 are supported at one end by side wall member 44. However, means may be provided for support at their other ends also, if desired, by appropriate design modifications. Feed roller assembly 33 consists of a feed roller 39, a friction wheel 56 of substantially the same diameter as the feed roller, and an element of the drive means 42. Rotary motion is induced in the feed roller 39 by means of the traction between the gum-free surface 18 of the tape and the feed roller 39 as the dispenser means 14 is caused to move forward and with a downward pressure against the surface 100 through the means 32. Although normally this traction is sufficient to cause continuous rotation of the feed roller 39, the back surface 18 of the tape is nevertheless quite smooth and so additional positive drive is obtained through the friction wheel 56, which contacts an adjacent portion of the surface 100. Further, should the normal traction fail to develop between the gummed side of the tape and the surface 100, due, say, to a temporary break in the continuity of the ever-tacky gum layer, the positive drive obtained through friction wheel 56, will cause rotation of the drive means 42 and the feed roller 39 which, in turn, will induce motion in the tape. The friction wheel 56 imparts additional stability to the device as it is pushed across said surface and tends to induce the application of an even pressure across the full width of the tape segment 48 by facilitating the maintenance of parallelism between tape feed roller spindle 38 and the plane of the surface 100. Feed roller 39 and friction wheel 56 are preferably provided with medium hard rubber surfaces which will provide good surface friction and which will permit some degree of accommodation to slight irregularities in the surface or surfaces on which the dispenser means is operating.

The take-up spool assembly 45 consists of a take-up spool 41, a slipping clutch means 43, and an element of drive means 42. Take-up spool 41 is preferably identical to, and interchangeable with, the tape roll core 13, so that on depletion of the tape roll, the take-up spool with its accumulation of waste tape body may be discarded and the tape roll core substituted in its place, ready for reloading. The diameter of the take-up spool 41 is preferably greater than the diameter of feed spool 39 so that a slight overdrive will result during the initial operation with a fresh tape roll. As the outer diameter of the take-up spool 41 is increased in operation, owing to the accumulation of waste tape body, slipping occurs. Rotation is transmitted through drive means 42 to slipping clutch means 43 which, as shown in Figure 2, consists simply of a rigid spool which has been provided with a sleeve of tough resilient material such as vulcanized rubber which normally has an outside diameter which is slightly larger than the inside diameter of the take-up spool 41 which is slipped over the sleeve and slightly compresses it. The rotational motion is thus transmitted to the overlying take-up spool through friction and the tape body is thereby taken up so that no slack can develop. As overdriving occurs, the inner surface of the take-up spool 41 slips over the sleeved spool on which it is mounted. If desired, different clutch means may be provided, of which there are a number of types in common use.

As may be seen on Figures 1 and 3, the tape roll 12 is wound with the ever-tacky gum 24 on the inner surfaces of the convolutions, the first segment 48 leading to the feed roller 39 in such manner as to expose the gum as the same is applied to a surface 100. As the gum contacts the surface 100 under pressure imparted through means 32, the ever-tacky gum layer becomes deposited in a line upon the surface 100 as the tape body 16 follows the curve of the feed roller 39. A moderate force applied through means 32 will induce relatively high unit pressure at the point of application because the bearing area against surface 100 is quite small. The second segment 50 of the tape which is now stripped of the ever-tacky gum layer, then passes over a portion of the tape roll 12 at which point the outer surfaces 18 are in contact, while a third segment 52 engages the take-up spool 41 to be wound thereupon. Owing to the existance of friction between the tape roll core 13 and the outer surface of the mounting spool 27, means is provided for preventing too rapid feed to the feed roller 39 as the tape is dispensed from the tape roll 12, and for preventing unrolling of the tape roll as the tape is removed from contact with the deposited layer of ever-tacky gum 99, once a section of ever-tacky gum of the desired length has been deposited on surface 100. The effect of this friction is supplemented by the existence of a small amount of sliding friction between the engaged tape surfaces 18 at the point where the tape body passes over a portion of the tape roll.

The side wall 46 of cover 45 helps to align the edges of the various segments of the tape along a common plane and a similar function is performed by guide plate 58. Reasonable clearance is provided between the cover side wall and the guide plate so that binding of the tape does not occur. When the tape roll 12 is exhausted, the device may be disassembled, the accumulated waste tape body 16 on take-up spool 41 discarded and fresh roll 12 and take-up spool 41 may be installed.

Turning now to the second embodiment of the invention, the dispensing means includes a housing 60 having first and second chambers 62 and 64, respectively, a tape roll 66 being disposed in the first chamber 62. In the case of the second embodiment, the tape roll 66 is wound such that the gum faces outwardly as the same is unrolled.

The roll is supported upon a spindle 68, and tape is fed to a feed roller 70 disposed within an opening 72 in the housing 60, and supported by a spindle 74 mounted upon the inner surface of said housing. Chain means 78 interconnects feed roller 74 with a take-up spool 76. An idler wheel 80 is mounted upon a supporting arm 81, the arm being provided with a spring 82 to urge the arm 81 to rotate in a counter-clockwise direction as seen on Figure 5, about a spindle 83. As may be seen on the drawing, the idler wheel 80 serves to resiliently urge the waste tape 84 into contact with the take-up spool 76, whereby the same may urge the waste tape into the second chamber 64 during use. If desired, idler wheel 80 may be coated with a repellant so that if any particles of adhesive should remain on the tape body after passing over the feed roller there will be little tendency for the tape to adhere to the idler wheel and to become wrapped around it. When the tape is completely exhausted, or at any prior time, the housing 60 may be disassembled for removal of the waste tape.

Turning now to the third embodiment of the invention, parts corresponding to those of the second embodiment have been designated by similar reference characters with the additional suffix prime ('). The third embodiment differs from the second embodiment principally in the elimination of the second chamber 64, and the provision of a slot 88 through which waste tape may be fed outwardly of the housing 60'. Preferably, housing 60' is provided with an overhanging lip 61 which is provided with a tape cutting means such as a sharp serrated edge to facilitate removal of the projecting tape body. The dispenser means illustrated in Figure 6 is of a "pulling" rather than pushing type: However, all of the embodiments of the invention lend themselves to either "pushing" or "pulling" dispenser types as desired, through simple design modifications, and, by employing housings which are designed so as to be roughly symmetrical about their vertical axes, to combination "push-pull" types.

Turning now to the fourth embodiment of the invention, the same includes a housing 94 having a first opening 96 through which the gum is dispensed and a second opening 98 through which the spent tape is rejected. The tape roll 102 is mounted upon a spindle 103, with the gum outwardly disposed, and a feed wheel 104 serves to apply the same to a desired surface. Spent tape is maintained in contact with the roll 102 by an idler wheel 105 mounted for rotation on an arm 106. The arm 106 also includes a curved guide member 107 which disengages the spent tape from contact with the roll and which also supports the spent tape as it passes through the opening 98. The guide member 107 also serves as a convenient means for disengaging idler wheel 105 from contact with roll 102 when loading the dispenser with a fresh roll of tape. In addition the guide member is preferably provided with a cutting edge 14 at its outer extremity to facilitate removal of the projecting waste tape. Owing to the fact that waste tape is driven by the roll 102, no separate take-up spool is necessary. The spring 110 accommodates for changes in size of the tape roll as the same is consumed, as does the relatively large exit opening 98 which permits free movement of the guide member 107. Housing 94 is preferably provided with a removable cover, preferably of transparent plastic (not shown).

Turning now to the fifth embodiment of the invention, to avoid needless repetition, parts corresponding to those of the fourth embodiment have been designated by similar reference characters with the additional suffix prime. The fifth embodiment differs from the fourth embodiment solely in the elimination of feed spool means, the tape being applied directly to a surface by pressing the roll directly in contact therewith, the opening 96' being substantially enlarged as compared to the opening 96 to permit substantially one-half of the roll 102' to project therethrough.

It may thus be seen that I have invented novel and highly useful means for applying transferring type pressure sensitive tape to a surface, in which the device is adapted to press the tape upon the surface such that the pressure-sensitive adhesive disposed thereon may be continuously, easily, and conveniently transferred to the surface which it is desired to coat, the means also providing for the simultaneous removal and disposal of the stripped tape body, and that I have also invented highly useful improvements in transferring type pressure-sensitive tape particularly appropriate for use in conjunction with the aforesaid means. The device, including both tape and dispenser, may be produced at a reasonably low cost to permit relatively wide sale and distribution, and is substantially trouble-free in operation. Exhausted tape is readily removed to be replaced by unused tape, and the device may be employed by those possessing only ordinary skill. The invention embraces not only hand operated dispensing means, in which the dispenser means is moved relative to a fixed surface, but also, fixed dispensing means, or machines, employing the basic principles set forth in this specification in which the surface is made to move relative to the dispensing means. Devices in this latter category may include means for positioning and guiding articles relative to the feed roller or rollers (in the case where it is desired to apply two or more lines of adhesive to an article simultaneously), and means for feeding an article through the fixed dispenser means while in continuous contact with the feed roller through the overlying section of tape, which may be manual, or mechanical (but independent of the basic dispensing means), or through the provision of a rotating feed roller assembly which feeds the article past itself by means of friction as it simultaneously causes the tape to deposit its layer of ever-tacky gum upon the surface of the article. The feed roller assembly in such devices may be resiliently mounted and adjustable in such manner as to accommodate articles of varying thickness within a desired range of pressure.

I wish it to be understood that I do not consider the invention limited to the exact details of structure shown and set forth in the specification, for obvious modifications will occur to those skilled in the art to which the present invention pertains.

I claim:

1. A device for applying pressure-sensitive transferring type tape comprising: a housing having an opening through which a strip of said tape may project for application upon a surface disposed externally of said houing, a tape roll disposed within said housing, a feed roller disposed at least partially externally of said housing, and a take-up roller adapted to conduct said strip of tape away from said feed roller, said take-up roller being driven by said feed roller and being provided with slipping clutch means to permit adjustment for the size of the coil of tape as the same enlarges; said slipping clutch means including a rigid spool, a sleeve of resilient material having an outside diameter which is slightly larger than the inside diameter of said take-up roller, said sleeve being mounted upon said rigid spool, said take-up roller being positioned upon said sleeve, whereby upon the transmission of motion to said rigid spool, said take-up roller may be driven at an angular velocity less than that of said spool.

2. Structure according to claim 1 in which the feed roller is appreciably wider than the width of the tape which it accommodates.

References Cited in the file of this patent

UNITED STATES PATENTS

| | | |
|---|---|---|
| 2,191,704 | Bennett | Feb. 27, 1940 |
| 2,206,899 | Kellgren | July 9, 1940 |
| 2,289,642 | Flood | July 14, 1942 |
| 2,496,349 | Kellgren et al. | Feb. 7, 1950 |
| 2,511,857 | Fritzinger | June 20, 1950 |
| 2,532,011 | Dahlquist | Nov. 28, 1950 |
| 2,541,444 | Storey | Feb. 13, 1951 |